(12) United States Patent
Hsu

(10) Patent No.: US 6,717,108 B2
(45) Date of Patent: Apr. 6, 2004

(54) ELECTRIC ARC WELDER AND METHOD OF DESIGNING WAVEFORMS THEREFOR

(75) Inventor: Christopher Hsu, Mentor, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/252,575

(22) Filed: Sep. 24, 2002

(65) Prior Publication Data

US 2003/0071025 A1 Apr. 17, 2003

Related U.S. Application Data

(60) Provisional application No. 60/328,577, filed on Oct. 12, 2001.

(51) Int. Cl.[7] ................................. B23K 9/09
(52) U.S. Cl. .............................. 219/137 PS; 219/130.51
(58) Field of Search .................. 219/137 PS, 130.51

(56) References Cited

U.S. PATENT DOCUMENTS

| | | | |
|---|---|---|---|
| 5,278,390 A | 1/1994 | Blankenship | |
| 6,002,104 A | 12/1999 | Hsu | |

*Primary Examiner*—Clifford C. Shaw
(74) *Attorney, Agent, or Firm*—Fay, Sharpe, Fagan, Minnich & McKee, LLP

(57) ABSTRACT

A method of designing a series of waveforms for current cycles generated by a waveform generator to control the waveforms of a welding process performed by an electric arc welder, where the waveforms are stored in a memory stack by work points. The method comprises: integrating the arc current of the waveform designed for each of the many work points to obtain an integrated amount; plotting the integrated amounts for each of the work points; creating a regression curve statistically matching the plotted amounts to reveal outlier amounts; selecting an outlier amount; and, changing the waveform corresponding to the selected outlier amount to decrease the deviation of the integrated amount of the changed waveform from the regression curve.

15 Claims, 6 Drawing Sheets

ELECTRIC ARC WELDER AND METHOD OF DESIGNING WAVEFORMS THEREFOR

This application claims priority of prior copending U.S. Provisional Application Ser. No. 60/328,577 filed Oct. 12, 2001.

The present invention relates to the art of electric arc welding with a welder having a power supply of the switching type and more particularly to an electric arc welder of this type combined with a novel and unique method to design the waveforms used by the welder.

BACKGROUND OF INVENTION AND INCORPORATION BY REFERENCE

Electric arc welding involves the movement of an electrode toward a workpiece while current is passed through the electrode and across an arc between the electrode and workpiece. Although some electric arc welders utilize a non-consumable electrode, most of the mass production arc welding involves an electrode which is consumed during the welding process whereby the electrode is melted by the arc and deposited on the workpiece. Thus, an arc welding process includes variable process characteristics, such as wire speed or electrode speed, gas composition, electrode diameter and workpiece metal. The actual electrical arc welding process at the production site takes into consideration these characteristics and involves a non-linear complex control system which determines the applicable metal transfer mode and the electrical parameters of the power supply performing the welding process. In order to achieve desirable results, a waveform is selected having several control parameters, which waveform is customized for the exact condition of each welding application. Thus, controlling arc welding has become an art which demands substantial knowledge and experience to select a waveform having several control parameters to produce an optimum welding process. A large number of controllers have been developed for use with electric arc welders that have real time current waveforms developed by welding engineers to optimize the welding process performed in the field. To accomplish this objective, a microprocessor based controller has been developed and is now used that allows an operator in the field to select one of many welding waveforms by merely using one of several overlays. This successful microprocessor based controller is illustrated in Blankenship U.S. Pat. No. 5,278,390 that is incorporated by reference herein. By using a known template for the controller, an operator selects a welding waveform having the desired control parameters especially developed for the selected weld process by a skilled welding engineer. This successful controller had a certain amount of adjustability in the field; however, such on-site adjustments were limited. Mass production use of arc welders has created a demand for the ability to conveniently adjust certain control parameters of the welding waveform in the field, especially when the welding process conditions are different than what is used in designing standard waveforms shipped with the welders (such as cable length, shielding gas and welding wire). Thus, there was a need for a controller to be used with an electric arc welder, where the controller can process a desired waveform that is adjusted interactively at the manufacturing site so the waveform is optimized for welding conditions and welding requirements for the job.

To fill this need, an electric arc welder was developed with a microprocessor based controller for the specific arc welder. This welder is shown in Hsu U.S. Pat. No. 6,002,104 incorporated by reference herein. The welder has a switching type power supply for creating a welding cycle, with a real time current waveform constituting several control parameters by rapidly switching a D.C. current in a controlled fashion by a pulse width modulator and it will be described with respect to such switching type power supply. This prior patented controller was used with various switching type power supplies normally used in electric arc welders; however, the Hsu patent shows a down chopper power supply for simplicity. In practice, an inverter type power supply having a waveform controlled by a pulse width modulator was controlled in accordance with the present invention. The microprocessor based controller included means for displaying a waveform generated on an electrically operated waveform screen, such as a CRT. In this manner, the operator at the production site viewed the actual waveform to be processed by the electric arc welder under the direction of the patented controller. Interactive means were employed for manually adjusting at least a portion of the waveform displayed on the waveform screen to generate a new waveform operating on the waveform screen and having the desired control parameters. Consequently, a prebuilt waveform was first displayed on the CRT, normally in a graph exhibiting current versus time. To change one of the control parameters, such as background current, peak current, current ramp, etc., a manual adjustment of the prebuilt waveform was performed manually and interactively on the waveform screen. In this manner, a new current waveform was exhibited on the waveform CRT screen. In accordance with somewhat standard practice, before the patented arc welder the pulse width modulator of the power supply was controlled in accordance with the newly created current waveform to cause the power supply itself to generate a welding cycle with the real time waveform corresponding to the new waveform on the waveform screen. The welder power supply executed the new control parameters exhibited as control parameters in the new waveform. In this manner, a desired waveform was exhibited and used by the electric arc welder. If there was a need to change a control parameter of the exhibited waveform, the waveform itself was modified visually by the operator on site and then employed for control of the electric arc welder. This interactive changing of the waveform, as it was visually displayed on a waveform screen, was novel to the welding field and was implemented by including a JAVA virtual machine with a welder control application program or an applet running within a browser in JAVA language. The JAVA control program was dedicated to the specific electric arc welder combined with the controller. Thus, the consumer product was an electric arc welder having a power supply with a microprocessor based controller that was driven by a program in JAVA language. This concept was accomplished by using a JAVA virtual machine as part of the on site controller. This new electric arc welding was interactively manipulated to create a waveform for controlling the actual real time waveform of the welding process. The controller performed its functions through real time adjustment of the pulse width modulator used in the switching power supply driving the welder.

In a welder using the patented technology of Hsu U.S. Pat. No. 6,002,104 the welder has a microprocessor with a JAVA virtual machine and controlled by at least one control application program in JAVA language. The program was dedicated to the particular welder being controlled. The microprocessor system included hardware with a first interface for an interactive display screen and a second interface for a manual data entry device, such as mouse or keyboard, that was used interactively to change the waveform on the display screen preparatory to the waveform being implemented on a digital communication link (such as ethernet or infrared) for outputting control parameters to the welder. The same communication channel was used to input operating parameters from the welder. In this manner, the electric welder was controlled by manual manipulation of the actual waveform to be used in the welding process preparatory to implementation of the welding process. As changes are required, certain control parameters were adjusted on the display screen to merely change the shape of the waveform being displayed. When the operating parameters from the welder were inputted to the microprocessor of the controller, a separate "scope" application program in JAVA language was selected and implemented by the controller. In this manner, the CRT of the controller was converted from a waveform editor to an oscilloscope display for reading parameters from the welder and for displaying these parameters as a soft oscilloscope on the face of the controller. The scope display used a window separate and distinct from the window used for editing the waveform. The screen of the controller was used to display either the waveform processed by the waveform editor application program or the oscilloscope plots processed by the scope application program. Both programs were processed by the JAVA virtual machine which was a part of the welder. The application programs were loaded into the virtual machine by a CD ROM that is loaded at the factory to program each of the welders preparatory to delivery. The physical media of distributing the JAVA object code or bytecode from the welding manufacturer to the customer used other forms, such as a floppy diskette, E-mail, web page and down loading by a modem. To change the operation program for the welders in the field, the patented welder periodically updated the control application program and/or the scope application program of the welders by a new CD ROM or by an Internet feed.

The patented controller of Hsu U.S. Pat. No. 6,002,104 displayed on its screen a waveform series of read out devices adjacent the waveform screen. A series of control parameters for the waveform were displayed adjacent the waveform screen, as read out values. The waveform was displayed on the waveform screen and contained a series of control parameters, some of which were recorded as read out values on the face of the controller adjacent the waveform screen. This total display is shown in FIG. 2 and is referred to as the graphic user interface or GUI. This display is used interactively to modify the waveform. The variable tables and waveform logic is provided by the memory stack as shown in FIG. 4. As an example of the display usage, the peak current of the waveform is displayed in an alpha numerical numbers on the face of the controller. As the waveform was modified interactively on the screen, the read out value was automatically changed accordingly. In addition, by adjusting one or more of the displayed control parameters at the read out device, the waveform itself was changed accordingly. The displayed control parameters, shown in the read out devices, had corresponding lock control parameter means for manually locking the display control parameters at preselected read out values. In this manner, the waveform was adjusted to change the value of a locked out control parameter. The prior art controller included a first override that was implemented to limit the value of one or more of the control parameters. In other words, if maximum current of the welder was at a set point, the control program processing a given waveform would prevent adjustment, either interactively or by a read out device, of the current to a level above the set maximum level. The same concept was used with a relational constraint wherein there is a fixed relationship of one control parameter to another control parameter. This fixed relationship was maintained. In this fashion, when one of the control parameters was adjusted, the other parameter is adjusted accordingly to maintain the set, fixed relationship. These are schemes utilized in the prior art patented welder to constrain the interactive manipulation of the waveform on the waveform screen or adjustment of the waveform through read out devices on the face of the controller. The JAVA virtual machine of the prior controller is provided with two or more application programs that are stand alone and can be selected by the operator who selects one or the other programs to be executed. The hardware of the controller includes a mouse or keyboard which latches onto certain points on the displayed waveform and allows the points to be moved or dragged in accordance with standard microprocessor operation. Consequently, there were graphically manipulating current waveforms for an arc welder in real time using JAVA technology. The welder monitors the actual waveform of the welder by analyzing operating parameters and using measurable electrical signals, such as arc current and voltage, derivative signals, such as impedance, power and energy, and process modes of operation. By using this concept, the operating signals or parameters from the welder itself were used to display and apply impedance of the arc and cable and instantaneous power of the arc and cable. Average current and voltage are sampled at a fixed rate and the welding time and the accumulated energy were also capable of being displayed in real time. If the optional scope program was employed, the output waveform created on the screen was analyzed and numerical data was displayed from various aspects of the displayed operating parameters. Other aspects of the actual operating condition of the welder were displayed and analyzed by using the scope program of the controller, not forming a part of the present invention.

In the prior art electric arc welder patented in Hsu U.S. Pat. No. 6,002,104, the processing logic was fixed and inflexible so that only certain types of waveforms pre-built into the program could be processed. For instance, a fixed wave shape template was selected for display and manipulation. See FIG. 3. The basic aspects of the template were fixed logic. Thus, the welder with a JAVA virtual machine could only select fixed templates for processing of specific current waveforms. There was no ability to select from a memory location certain data and display this as a waveform in a manner to change the behavior of the waveform template. In the prior art unit, the weld program compiled as object code or bytecodes was fixed to manipulate a fixed waveform logic of FIG. 4. If the waveform in FIG. 4 is changed, the JAVA source code must be changed to support the new waveform logic.

THE INVENTION

The present invention involves designing the various waveforms for the work point stack to output selected waveforms for controlling the electric arc welder through a waveform generator in accordance with standard technology.

In accordance with the invention, there is provided a method of designing the series of waveforms for current cycles generated by a waveform generator that controls the individual waveforms of an electric arc welder. A welding engineer designs the various waveforms for the work points such as wire feed speed values. They are then loaded into a memory stack for use by the waveform generator when the welder is to be operated at the various work points. When designing the waveforms, the welding engineer utilizes perceived parameters for the waveforms. In some instances, these parameters do not produce the desired waveforms for each of the different work point operations. The present invention involves a method for designing the waveforms so that they do indeed conform to a desired implementation of the welding process. In practice, such waveforms are digitized and are stored in a memory stack by individual work points. When a give work point is selected for the weld process, that particular waveform in digitized data form is outputted for use by the waveform generator of the welder. The present invention assures consistency between the many waveforms in the stored memory stack. This method involves integrating the arc current of the waveform that has been designed for each of the many work points. In this manner, an integrated amount is obtained for each waveform stored for use at each work point. The invention involves plotting the integrated amounts for each of the work points and creating a regressive curve statistically matching the plotted amounts to reveal any outlier amounts. In other words, when plotting the integrated amount for each of the work points on a graph, the graph is statistically analyzed by a computer program using a regression, either linear or polynomial, to provide a curve. This curve reveals any outlier which is a deviation of the integrated amount from the line which statistically defines the proper value for the various integrated amounts. Then, any of the outlier amounts that deviate from the regression curve are noted so the particular waveform that is deviated from the statistical curve is manually changed in accordance with standard practice using previous technology incorporated by reference herein. That waveform then is redesigned and adjusted to bring the integrated amount into general conformity with the statistical regression line so that there is a smooth distribution of the integrated amounts along the regression line. In the preferred embodiment, the regression curve is a polynomial regression line. However, a linear regression line using the least squares fit concept has also been employed in practicing the invention. Either a regression line or regression curve is obtained by a standard computer algorithm for analyzing plotted values. In the preferred embodiment, the line is straight.

In accordance with another aspect of the present invention, the integrated values of the current for each waveform of the individual work points is averaged by dividing the integrated amount by the period of the waveform. This provides an average current for the individual waveforms making up the various waveforms of the work points to be used by the welder for performing a given welding process. These average values are plotted statistically to discern outliers and correct the waveforms for bring the outliers closer to the statistically developed curve. This further aspect of the invention may also employ the concept of adding a constant to the average value and then square this summation to produce points that are plotted and compared with a regression curve. This manipulation is also effected to obtain a set of waveforms in a memory stack for a given welding process that changes according to the work point selected for the process.

The invention is directed to a method whereby a value for the waveform of each waveform in a series for a given welding process is obtained, plotted and compared to a statistical curve. Deviations from this statistical curve are noted and used by the welding engineer to modify the waveform corresponding to the deviated value or amount. In this manner, the various amounts or values for the various waveforms to be used at different work points are optimized and customized.

The primary object of the present invention is the provision of a method for analyzing an amount or value of a given waveform in a series of waveforms corresponding to work points of a given process to be performed by an electric arc welder and then statistically comparing a plot of these values or amounts to identify waveforms which need to be changed and/or customized to produce smooth operation of the welder performing the welding process.

Still a further object of the present invention is the provision of a method, as defined above, which method utilizes the integrated current of each of the waveforms in the array of waveforms for the various work points.

Another object of the present invention is the provision of a method, as defined above, which method involves dividing the integrated current for each waveform by the waveform period to produce a value representing the average current. This average current is then plotted or is used to produce a calculated value by adding a constant and squaring the summation.

Still a further object of the present invention is the provision of a method, as defined above, which method allows a welding engineer to produce the desired waveforms for the various work points in a welding process and then check the waveforms to determine their deviation from desired values for subsequent customization and correction.

These and other objects and advantages will become apparent from the following description taken together with the accompanying drawings.

These and other objects and advantages will become apparent from the following description taken together with the accompanying drawings.

PREFERRED EMBODIMENT OF THE INVENTION

Figure 1:
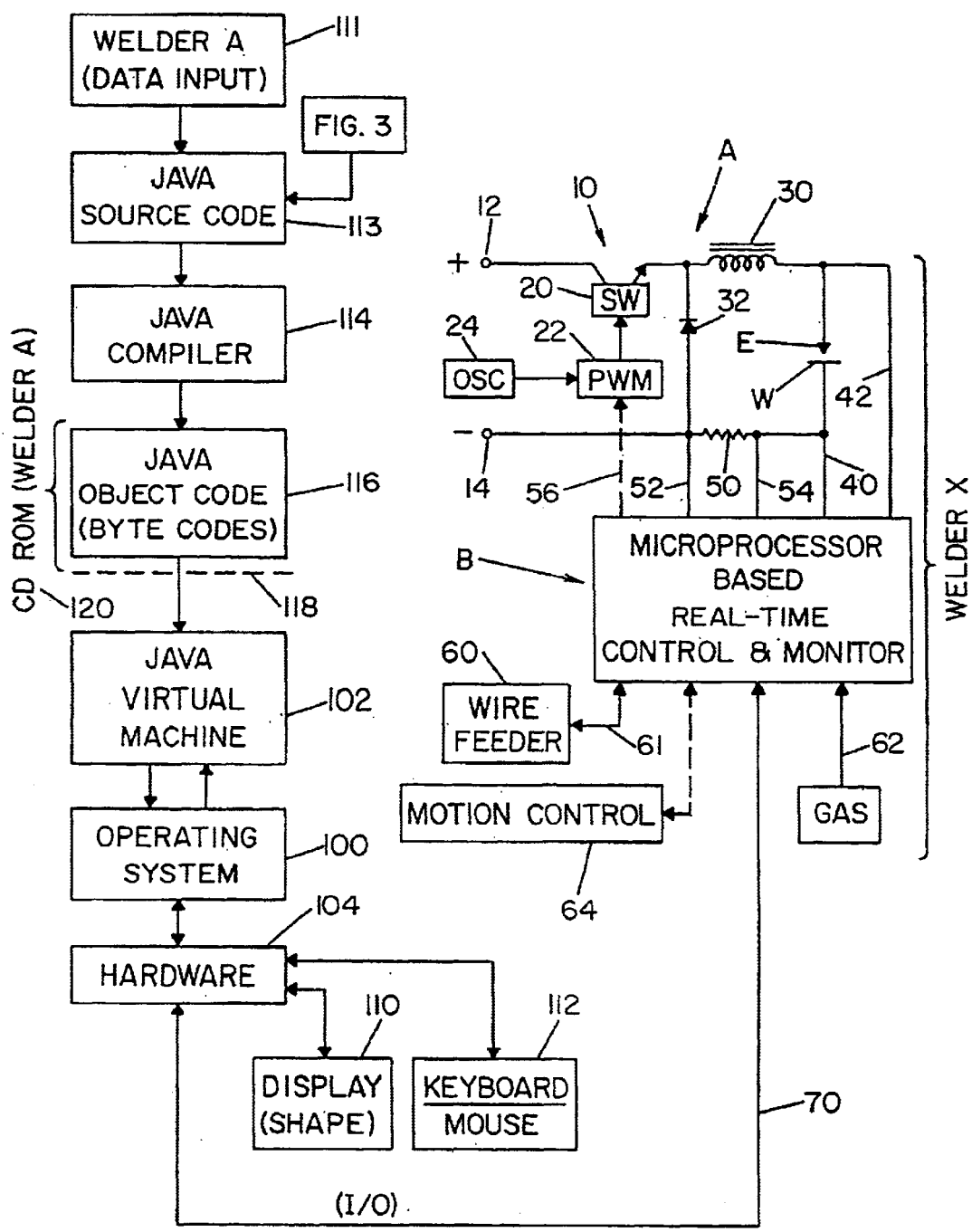
FIG. 1 is a control architecture of a controller and electric arc welder with a stand alone implementation of JAVA technology as disclosed in Hsu U.S. Pat. No. 6,002,104 and used for practicing the preferred embodiment of the present invention.

Referring now to the drawings, wherein the showings are for the purpose of illustrating the preferred embodiment of the present invention and not for the purpose of limiting same, FIG. 1 shows the prior art of Hsu U.S. Pat. No. 6,002,104. An electric arc welder A controlled by a somewhat standard microprocessor based controller B which is a real time control and monitor for welder A. Controller B is combined with welder A as a commercial product purchased for use in various welding processes, especially for mass production welding of consumer products, which welding is often done by a robot. The stand alone unit incorporating welder A and controller B uses any of a number of switching type power supplies, such as an inverter generally illustrated in Blankenship U.S. Pat. No. 5,349,157 or a buck converter or down chopper as generally shown in Stava U.S. Pat. No. 4,952,064. For the purposes of simplicity, welder A is shown as including a down chopper as part of power supply 10 which is used to switch a D.C. current at terminals 12, 14 in accordance with the operation of a switch 20. In practice, an inverter or a buck converter is used with a plurality of switches or switches arranged in various configurations. A simplified switching type power supply utilizes switch 20 controlled by a pulse width modulator 22 driven at a pulse rate determined by oscillator 24, which pulse rate is normally 10 to 20 kHz and preferably approximately 20 kHz. Current pulses occur at a rapid rate and are directed through a relatively small inductor 30 to perform a welding process implemented between electrode E, normally in the form of an advancing welding wire, and workpiece W. The duty cycle of the various pulses of switch 20 is controlled by pulse width modulator 22 so that the waveform of the current in the welding process between electrode E and workpiece W is accurately controlled and repeated consistently. In accordance with standard practice, welder A has a freewheeling diode 32, an arc voltage sensor for creating a voltage across lines 40, 42 and a current shunt 50 for creating a voltage across lines 52, 54 representative of the arc current. The voltages across lines 40, 42 and lines 52, 54 are directed to the input of controller B for the purpose of monitoring the welding process, which process is controlled by the voltage on line 56 that changes in a real time fashion to follow the shape of a waveform governing the welding cycle of welder A. In accordance with standard practice, electrode E is an advancing welding wire represented as a wire feed device 60 having a speed controlled by and monitored by controller B as indicated by line 61 or a fixed electrode is used, such as TIG welding. The welding process performed by welder A is modified according to the shielding gas employed in the welding process. The shielding gas is identified by data on line 62. When welder A is used for an automatic welding processes, such as robotic processes, the welding head is moved on a real time basis in accordance with a program in controller B that operates motion control device 64 in accordance with standard practice. The present invention relates to the control of welder A during the welding process. In the prior art, the control was not necessarily to the individual control of orientational coordinates of the welding gun and the speed of the movement of the welding gun as schematically illustrated by motion control 64. As so far described, welder A is standard and controller B is a device well known in the art and known to manufacturers of electric arc welders having microprocessor based controllers. One such controller is generally illustrated in Blankenship U.S. Pat. No. 5,278,390. The command signal on line 56 is analog; however, in the invention, the command signal to control the shape of the waveform is either analog or digital format.

The power supply is shown as having a single polarity. By adding a second output network, the weld process is in two polarities, i.e. positive and negative. See Stava U.S. Pat. No. 6,111,216; Stava U.S. Pat. No. 6,207,929; and Stava U.S. Pat. No. 6,291,798, incorporated by reference herein.

Controller B is operated by the logic on I/O conduit or digital communication link 70, which logic is the control parameters inputted into the controller. This same link outputs data or operating parameters from controller B. These control and operating parameters are processed in accordance with a software operating system 100 that may have any platform configuration with JAVA virtual machine 102. In Hsu U.S. Pat. No. 6,002,104 the virtual machine is loaded with one or more JAVA application programs for performing the waveform editing as hereinafter described. Hardware 104 interacts with display 110 and is controlled by manual data entry device 112 in the form of a keyboard or mouse. As so far described, the total product of welder A and controller B, with real time control and monitoring of the welder by JAVA technology, is disclosed in Hsu U.S. Pat. No. 6,002,104. Waveforms exhibited on interactive display 110 are modified by manual data entry device 112 to create a new waveform to generate the desired control parameters on link 70 for real time control of the welding process between electrode E and workpiece W. The control parameters control the welding process in accordance with the final waveform; however, visual display 110 plots the real time operating parameters of the welding process. Thus, controller B monitors the ongoing welding process dictated by waveform ultimated selected by the control application program loaded in virtual machine 102. In practice, display 110 and manual data entry device 112 are adjacent welder A; however, link 70 can be a remote communication line.

Figure 3:
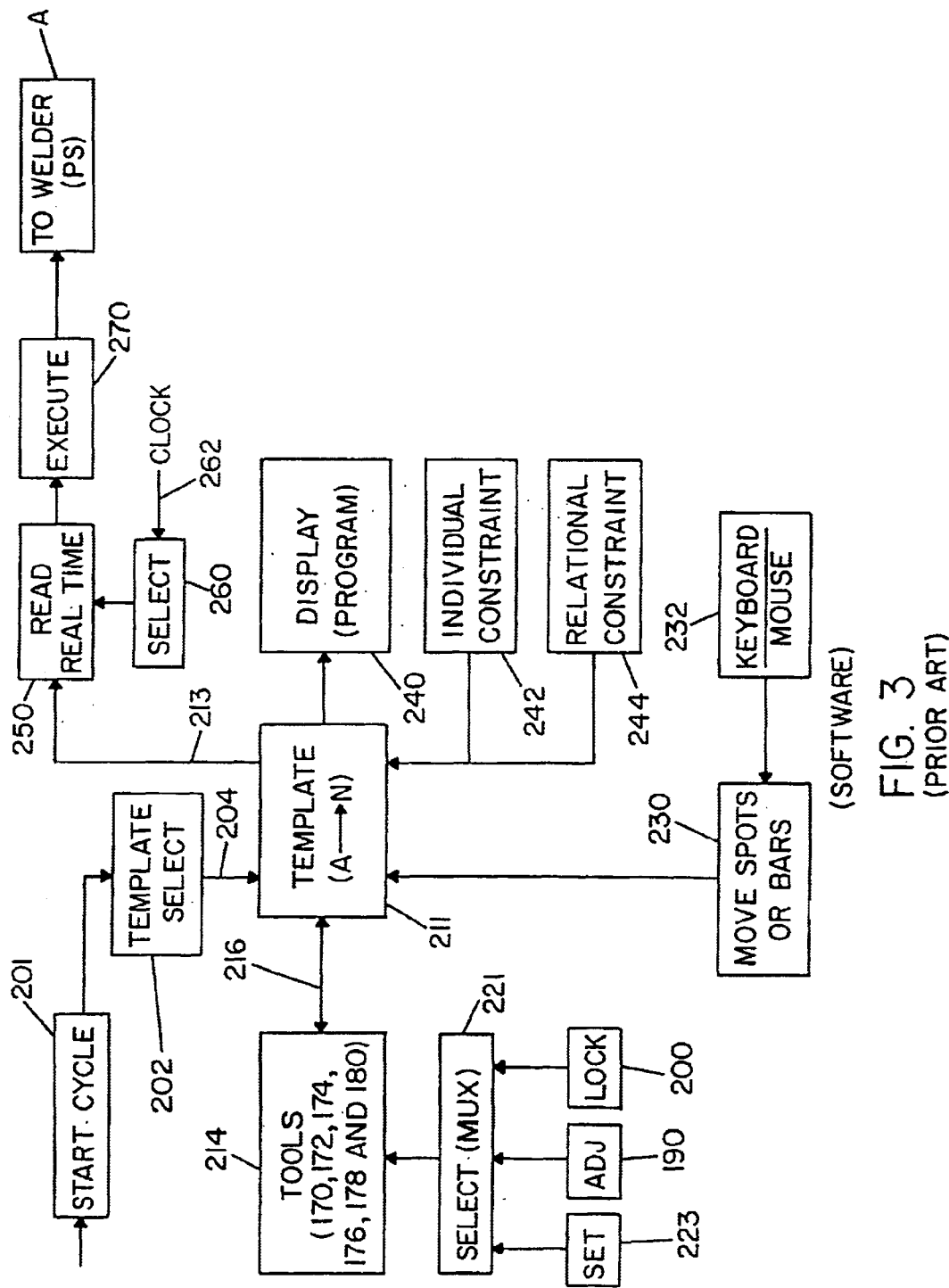
FIG. 3 is a functional block diagram of the control application program implemented by JAVA language and dedicated to a particular welder which program is used to program the architecture shown in FIG. 1 of the prior art electric arc welder.

JAVA virtual machine 102 is provided with a generic program. Data input indicated by block 111 has data that relates to welder A and is converted to JAVA source code, as indicated by block 113 which is predesigned. JAVA source code from block 113 is sent to compiler 114 to produce data in block 116 as bytecodes. The control program shown in FIG. 3 is also in JAVA language whereby the JAVA source code of the control program and the data specific to welder A are compiled and converted into bytecodes as indicated at block 116. This programming procedure is well known in the art and can be accomplished by persons in the welding industry to create a stand alone welder and controller having a JAVA virtual machine for implementing the unique control program. Compiler 114 compiles the source codes of block 113 into bytecodes at block 116 for use by virtual machine 102. The CD ROM implementation 120 of program of block 116 for the particular welder A is preferred; however, a tape or internet 118 could be used to load application programs into virtual machine 102. Welder A and controller B are commercial products, sold in the welding industry as a stand alone units which are programmed by an appropriate device, in practice a CD ROM containing bytecodes for application programs in JAVA language, such as an operating program illustrated in FIG. 3.

Figure 2:
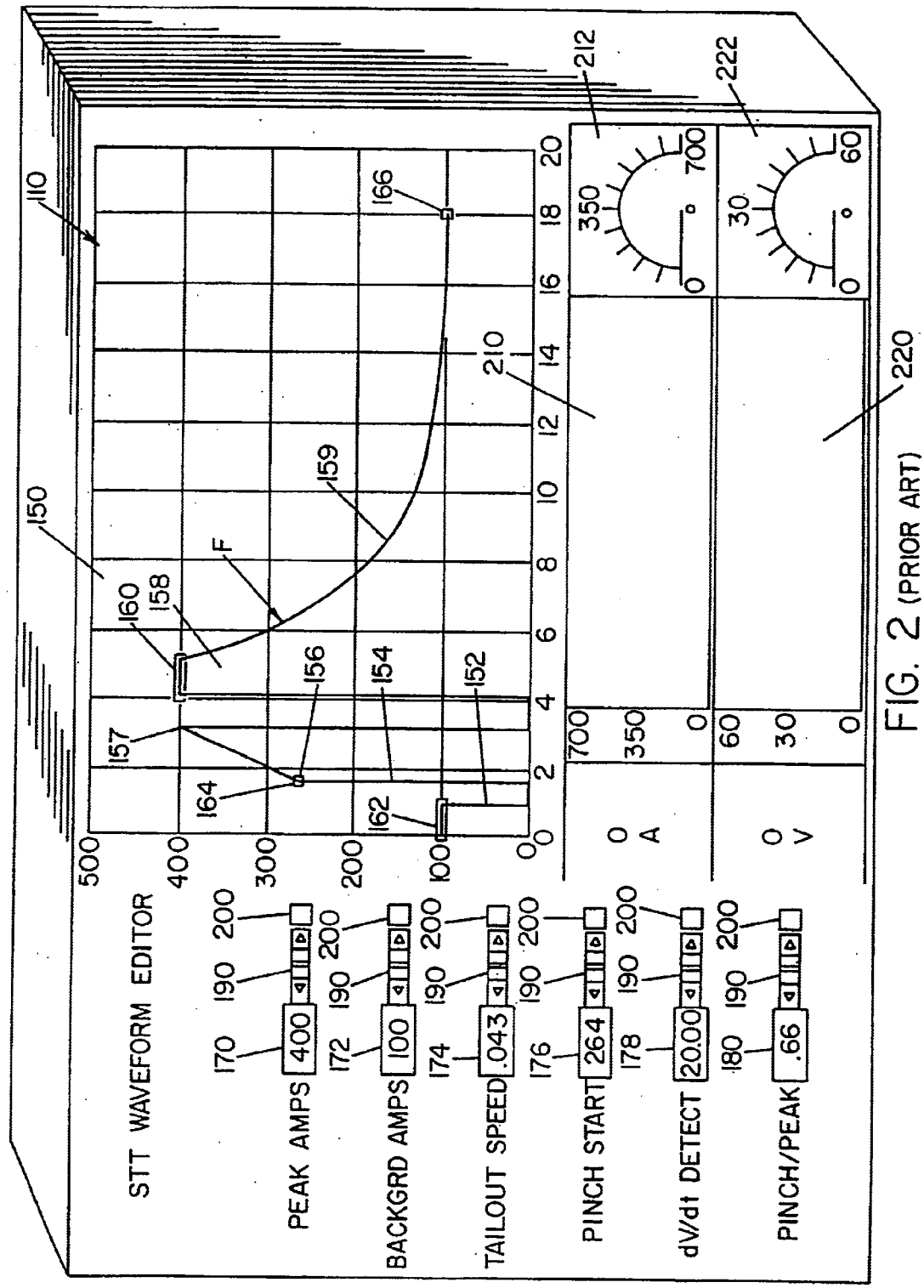
FIG. 2 is a front view of the CRT screen or graphic user interface showing the waveform and other visual devices when the controller is used to implement the script language program, which front view does not differ from the prior art shown in Hsu U.S. Pat. No. 6,002,104.

Operation of controller B to implement the control application program is illustrated in FIGS. 2 and 3. FIG. 2 shows interactive display 110 used for editing a waveform F to be used to generate the control parameters used for operation of the power supply of welder A to duplicate waveform F. Visually displayed on waveform screen 150 of interactive display 110 is waveform F. This waveform is processed by welder A. The illustrated waveform is a short circuit welding operation similar to the STT welding process where a short between the molten metal ball on electrode E and workpiece W is detected by a drop in voltage at 152. Then, the current is allowed to flow through the shorted metal, as indicated by line 154. An electrical pinch starts at point 156, which is shown as 264 amperes. At point 157 a dv/dt detect indicates an imminent rupture of the fuse (short). The current is then turned off for a short period of time and is then allowed to have a plasma boost 158 with a tailout along curve 159 awaiting the next short of the molten ball created by the arc of plasma after the fuse. Waveform F is representative in nature and is used by controller B to operate pulse width modulator 22 to follow waveform F during the welding process. Other waveforms on screen 150 can be implemented by welder A in the same manner. Persons skilled in arc welding would know how the variables are to be set.

Waveform F has a prebuilt or initial configuration when it is initially displayed on screen 150 of interactive display 110. The displayed waveform has certain portions which can be interactively moved. In this particular waveform, the peak current of the plasma boost is represented by a vertically movable bar 160. Background current of waveform W also has a vertically movable bar 162. Manual data entry device 112 allows an operator to select either of these bars by a mouse or keyboard and move the bars up or down. This action changes waveform F from the original prebuilt template by changing the current levels of the peak current 160 or the background current 162. In this particular example, waveform W also has two movable points 164 and 166 which can be moved vertically and horizontally, respectively. By interactively moving point 164, the current starting point for the pinch current is changed. In a like manner, moving point 166 left or right changes the tail out 159 of waveform F. Manipulation by a mouse to change either the level of bars 160, 162 or points 164, 166 modifies waveform F before the waveform is implemented in real time by controller B at welder A. Another waveform used for a different welding process would have different spots to be moved or bars to be raised or lowered. A prebuilt template is initially displayed on screen 150. Then the waveform is modified by moving the bars and changing the points to produce a similar waveform with different control parameters modified to create the desired waveform for use in the real time operation at welder A. The patented welder of Hsu U.S. Pat. No. 6,002,104 and the present invention both display a waveform to be used by controller B to direct operation of welder A. The waveform is visually edited or modified by merely interactively moving points and bars on the waveform to change the control parameter directed to bus 70 for control of welder A.

Interactive display 110 is provided with a number of read out devices or tools to also change control parameters of the displayed waveform F. The read out devices contain values given in alpha numerical numbers illustrated as peak amperes in read out device or window 170, background amperes in device or window 172, tail out speed in device or window 174, pinch start in device or window 176, dv/dt detect in device or window 178 and a relationship between the pinch current at point 164 and peak current bar 160 in device 180. Read out values in devices or windows 170, 172, 174, 176, 178 and 180 are the values for the displayed waveform F. As points 164, 166 are moved, the read out values change accordingly. The same is true of raising and lowering bars 160, 162. The tools or read out values in devices or windows 170, 172, 174, 176, 178 and 180 can be incrementally changed by associated scroll bars 190. If it is desired to lock a control parameter at a particular exhibited value in one of the devices or windows 170, 172, 174, 176, 178 and 180, the mouse activates a lock window 200 associated with the particular read out devices or tool. For instance, if the peak current is adjusted by scroll bar 190 to 400 amperes as is the maximum current desired for the waveform W, block 200 at window 170 is addressed by the mouse to lock the current at 400 amperes. The same operation is possible at the various tools. When a value displayed in a read out device or window 170, 172, 174, 176, 178 and 180 is a locked parameter, interactive manipulation of the points and bars on screen 150 cannot violate the constraints of the set value in the read out device. Interactive display 110 includes a graph 210 for a current plot together with an analog read out gauge 212. In a like manner, graph 220 plots the voltage level at the welding arc in a manner complying with analog read out gauge 222. As so far described, the present invention allows the implementation by welder B of waveform F. This waveform can be modified by a mouse or keyboard, subject to certain constraints at read out values 170, 172, 174, 176, 178 and 180, whereby the newly created or selectively modified waveform is implemented in a real time fashion by welder A.

The control application program in JAVA language used in Hsu U.S. Pat. No. 6,002,104 and in the present invention is illustrated in functional blocks in FIG. 3 where the start cycle block 201 allows an operator or welding engineer to select a desired prebuilt template A, as indicated by blocks 202. In the prior art the templates are fixed. Template A is loaded by line 204 into template manipulation block 211. Control parameters are directed from template manipulation block 211 through line 213 for control of the welding process at welder A in accordance with the actual template displayed on screen 150, as shown in FIG. 2. This is the control function of controller B, where welder A has a welding process determined by the ultimate waveform in block 211. When this monitor function is being implemented, the final controlling waveform is in a background window not visible on screen 150 of display 110. Read out value in devices or windows 170, 172, 174, 176, 178 and 180 are functionally manipulated as indicated by block 214 to changes the displayed read out values according to displayed waveform F. Block 214 is used to modify waveform F as previously described. Functional manipulation of waveform F by block 214 is input data on input/output line 216. Read out devices or windows 170, 172, 174, 176, 178 and 180 are multiplexed by multiplexer 221 so that the set value can be changed by entering an alpha numerical number as indicated by block 223. The scroll bar and control parameter locking device are operated by addressing the windows 190, 200, as previously described. Function block 230 indicates that spots or bars forming portions of waveform F can be moved by the data entry device 112, using functional program 232. Waveform F is reconstructed into the desired final configuration by action of manipulation subroutine of block 211 using information, or data, on line 216 and the interactive adjustment from functional subroutine 230. Values for windows 170, 172, 174, 176, 178 and 180 are outputted from block 211 on line 216.

Block 240 is the program for displaying the present waveform F, which has been edited or modified from an original waveform A to a new waveform N by the subroutine of block 211. Controller B executes the data or control parameters comprising the new waveform F. As indicated by functional block 242, a subroutine is provided wherein values of block 214 and movement of spots and bars by function subroutine of block 230 cannot change certain parameters of the waveform. For instance, background current 162 could not be greater than pinch start current 164. Such constraints are applied to functional block 211 for constricting manual manipulation as changes by read out devices 170, 172, 174, 176, 178 and 180 of waveform F. As indicated in the subroutine or functional subroutine 244, there are certain relational constraints which are also applied to certain control parameters. For instance, if the ratio in read out device or window 180 is locked at a set point, adjustment of the pinch current 156 will correspondingly adjust the peak current 160. The constraint subroutines indicated by functional blocks 242 and 244 are merely added program features used in the manual implementation of waveform F to a desired waveform for execution by welder A. As previously indicated, control parameters are directed to the welder A by line 213. Control parameters are read in real time, as indicated by functional block 250. The particular parameter being read and outputted, or executed, at any given time is selected in a sequence as indicated by functional block 260 at a rate determined by the rate of pulses on line 262. Executive program of block 270 executes the control parameters to duplicate waveform F as the welding process through controlling pulse width modulator 22 in accordance with standard switching technology.

Figure 4:
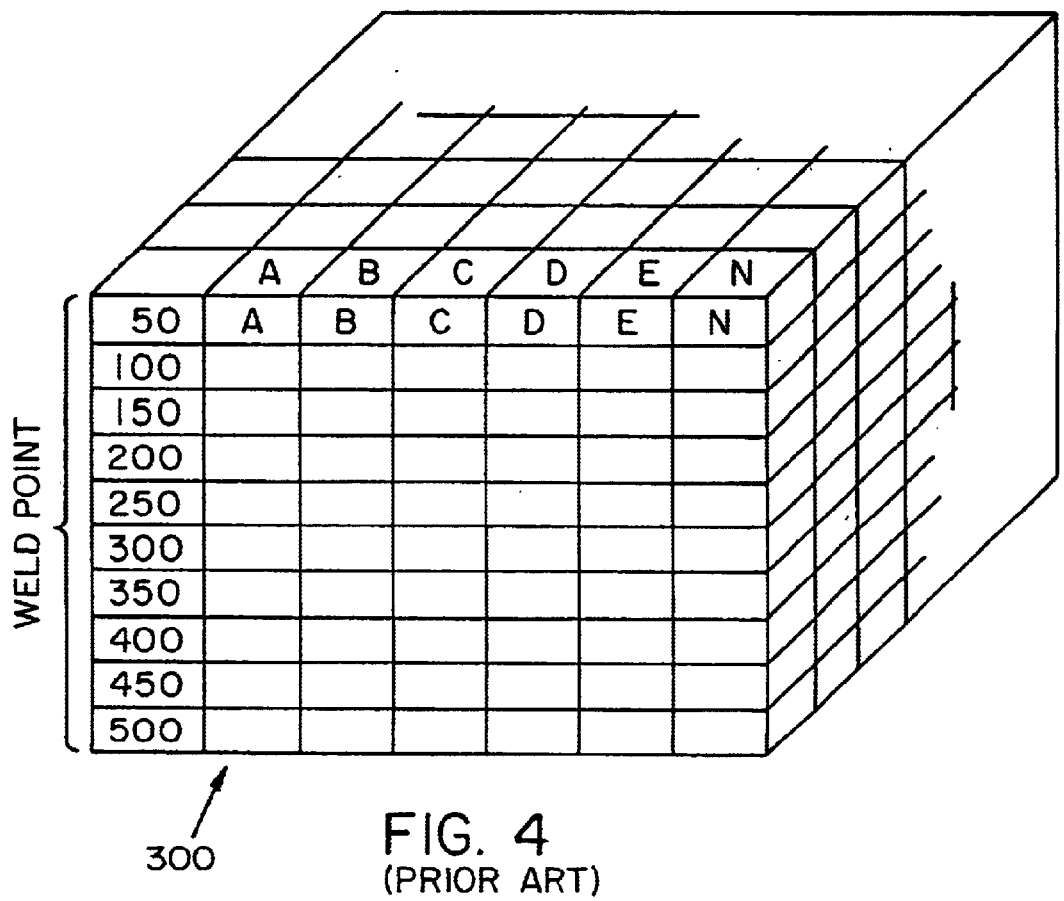
FIG. 4 is a schematic representation of a work point stack which is processed by using the present invention and includes parameters and waveform logic to control the welder.

Referring now to FIG. 4, data stack 300 includes the value of various parameters and is a part of the computer program and includes variable tables of parameters and the waveform logic to operator welder by the signal on line 56 to control pulse width modulator 22. This device converts DC bus to an output of the power supply tracing a desired waveform and dynamic behavior. The power supply can be an inverter or chopper, both of which are powered by input DC bus. Stack 300 also includes the parameter tables and waveform logic to control the welder with the waveform created on the GUI. A program determines where the data is located to be selected from the stack, where it is to be put or located in the graphic user interface displayed on CRT 150 as shown in FIG. 2. Waveform F is constructed by a program 320. In a like manner, the read out user variables of the GUI are controlled by a program. These two GUI components are specified in appropriate language. As previously described, the displayed waveform F, which is modified by interaction with the GUI by a keyboard or mouse 112. The modified waveform accomplished by the GUI is the waveform ultimately processed by electric arc welder A. The GUI program is a computer program that communicates data to and from stack 300.

Figure 5:
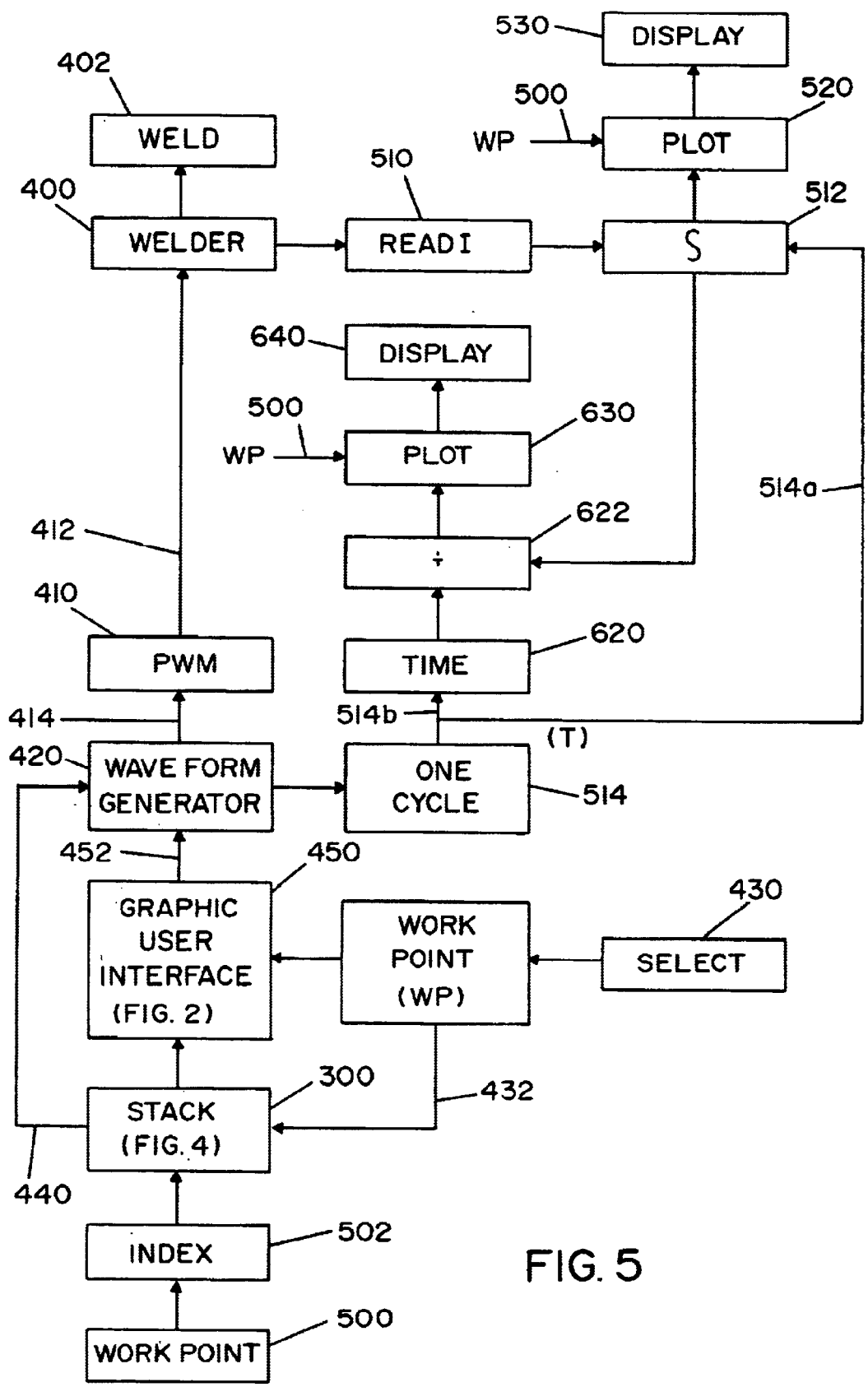
FIG. 5 is a block diagram illustrating the preferred embodiment of the present invention.

As so far described, electric arc welder A is controlled by pulse width modulator 22 to perform a welding process using a waveform selected at a work point in stack 300 shown in FIG. 4. A welding engineer inserts the parameters for the waveform used for each of the work points selected for operation of welder A. The invention involves assuring that the digital information created and stored in memory stack 300 produces a waveform having a desired characteristic for each of the different waveforms stored. To accomplish this objective, the present invention has been developed. The invention is shown in FIGS. 5–8. Referring now to FIG. 5, welder 400 represents welder A to perform a specific welding process at station 402. In accordance with standard practice, welder 400 produces a series of repeating waveforms constituting a welding process. Each of the individual waveforms is dictated and controlled by pulse width modulator 410 having an output 412 controlling the switching sequence of the high speed switching inverter of welder 400. The waveform created in analog or digital data in line 412 is controlled by the digital input or analog input 414 from waveform generator 420. The operating condition of the weld process is designated as a work point, which point may be wire feed speed.

Figure 6:
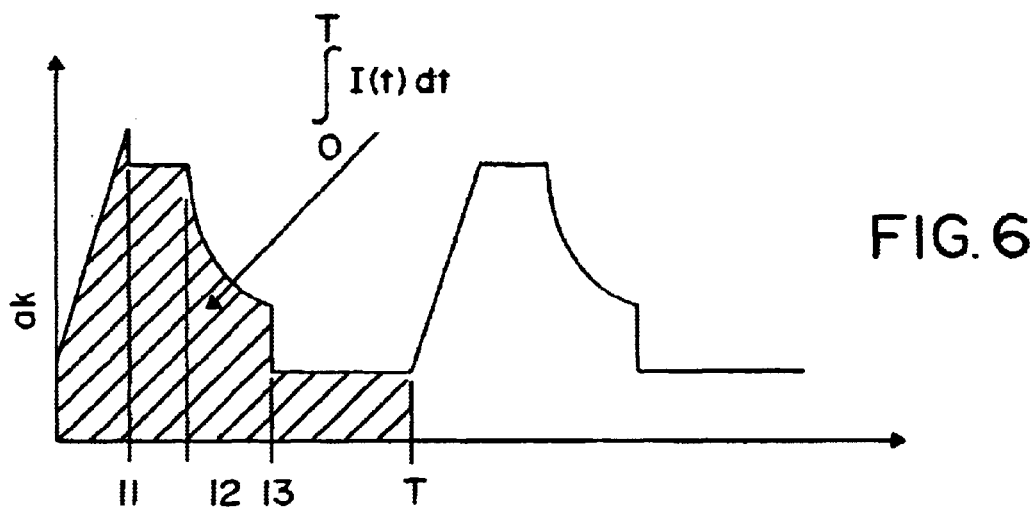
FIG. 6 is a graph showing a single current waveform for one of the work points of the welding process which current is integrated in accordance with the preferred embodiment of the present invention.
Figure 7:
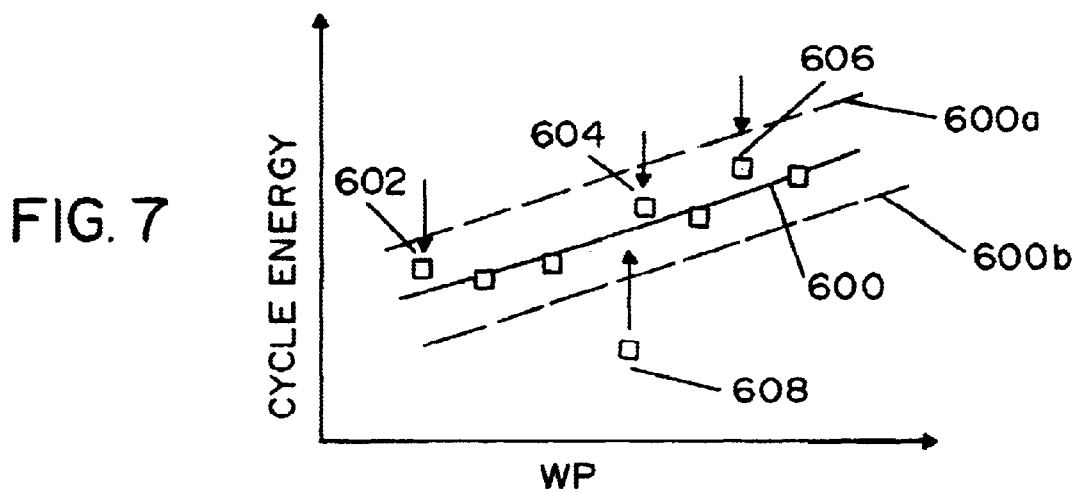
FIG. 7 is a plot of the integrated amounts for various work points in the welding process with a statistically created regression line revealing various outliers for subsequent adjustment by the welding engineer; and, FIG. 8 is a plot similar to FIG. 7 but utilizing values representing average current and/or a calculated amount involving the average current plus an offset constant and squared.

A waveform designed for a work point is used to control pulse width modulator 410 for a given welding process. The work point is selected by an operator as indicated by block 430. This selection procedure for the particular work point of the welding process addresses the waveform data in stack 300, as indicated by line 432. This selected waveform data is communicated by line 440 to waveform generator 420. Slight modifications can be made in the waveform displayed on graphic user interface 450 and passed to waveform generator 420 by line 452. Graphic user interface 450 is a prior art device shown in more detail in FIG. 2. As so far described, the operation of the welding process 402 by welder 400 is in accordance with standard welding technology. The selected work point is processed by waveform generator 420 to control pulse width modulator 410. At the welder manufacturing facility, stack 300 is customized by a welding engineer placing digital data at the various memory locations associated with specific work points of the welding process. At the manufacturing facility, a computer program is executed for assuring that the work points are consistent over the series of work points loaded into memory 300. This computer program is shown by the other blocks in FIG. 5. This method is used at the manufacturing facility before the welder is shipped. After the welding engineer loads the data for all waveforms, the data is analyzed in accordance with the invention and the waveforms are customized by using the invention. The data loaded in stack 300 is outputted to create a welding process for each of the various work points. A work point is selected and processed as indicated by block 500. After a first work point is processed by the welder, the next work point is processed until all work points have been processed. After a given work point has been processed, index block 502 causes stack 300 to output the next work point for communication with generator 420 by a path shown as line 440. Consequently, a first work point is processed by waveform generator 420. Then each of the subsequent work points are processed in accordance with the invention. Consequently, welder 400 is operated to perform the desired waveforms stored in stack 300 at the many work point locations. As each welding process is performed by welder 400, the arc current is read by a sensing device indicated as block (READ I) 510. This value for a given waveform is integrated by the program as represented by block 512. The integration occurs over period T of the waveform. This integration is shown in FIG. 6. The integrated value of a waveform is determined by cycle selector 514 and is provided to the program of block 512 by line 514a, which creates an integrated amount for each waveform. This is done by a computer program. The integrated amount is plotted as indicated by block 520. The amount is identified with its assigned work point WP addressed by selector 500. After each of the work points has been indexed by block 502 and an integrated amount has been plotted for the several work points, the graph as shown in FIG. 7 is displayed at block 530. Consequently, each of the work points is equally spaced on the coordinate of the graph shown in FIG. 7. This graph is displayed as indicated by block 530. In accordance with standard statistical mathematics, an algorithm is applied to the plotted information in display 530. This algorithm produces regression line 600 with outliers 602–608. In practice, a standard algorithm for polynomial regression is used. Since spaced work points of the welding process should generally follow a straight line, a polynomial regression algorithm and a least squares linear regression algorithm produces the desired regression line 600. The welding engineer at the manufacturing facility observes outliers 602, 604, 606 and 608. Outlier 608 has the greatest deviation from regression line 600. Consequently, the welding engineer selects this particular work point by block 430, as shown in FIG. 5. That work point is displayed on graphic user interface 450 for customization or redesign to cause the integrated amount 608 to be moved toward regression fine 600. In the example shown in FIG. 7, the other outliers 602, 604 and 606 are within a general tolerance shown as dashed offset lines 600*a*, 600*b*. By using this novel method, data stored in stack 300 produces a smooth transition between the various work points that can be selected at the manufacturing facility using welder 400. The method so far described is loaded in the controller of the welder. Consequently, the same procedure is used by a welding engineer at the manufacturing facility to either load stack 300 originally or to customize data in the stack 300 to produce a statistically sound array of work points for the welding process.

Figure 8:
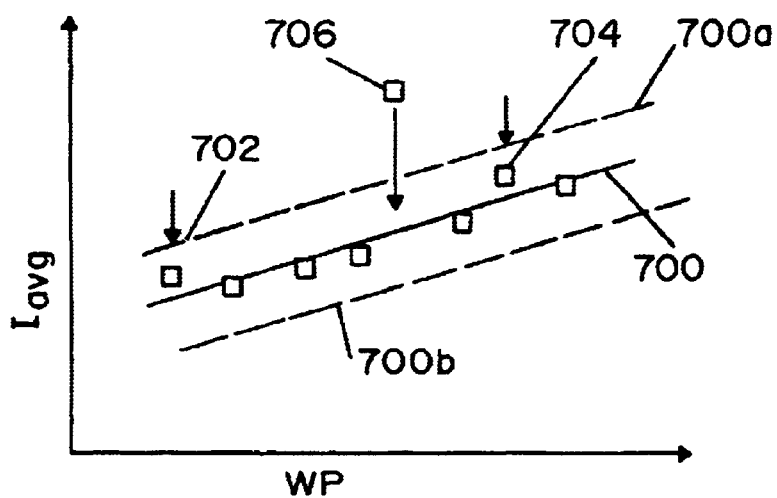

In accordance with another aspect of the present invention, the single cycle work point selector or subroutine 514 activates timer 620 indicated by line 514*b* containing the period of a given waveform. The digital information from timer 620 is used in the digital divider 622 for dividing the integrated amount from subroutine 512 by the actual time T of the waveform from timer 620. This produces an average current value. This value is plotted against the work point coordinates by subroutine 630. Plotting subroutine 630 has ordinates for the plotted data determined by work point selector 500. The plotted values are displayed at 640, and after a regression line 700 is constructed based upon the average current values. This displayed graph is shown in FIG. 8 and utilizes the statistical method described with respect to the graph of FIG. 7. Regression line 700 has offset or threshold lines 700*a*, 700*b* that generally define the acceptable deviation of the average current values. This same concept is used in the graph of FIG. 7. Outliers 702 and 704 are acceptable. Outlier 706 is not. Thus, a welding engineer at the manufacturing facility selects this particular work point by block 430 for redesign or customization by GUI 450, as previously described. This customization and change of the selected, displayed waveform is in accordance with standard technology well known in the prior art and shown in FIGS. 1–4. The same process can be done on site by a welding engineer, especially if the stack 300 is being reloaded. This may occur by an internet communication from the manufacturer to load a new welding process. Normally, the welder manufacturer uses the method of the present invention so that the welder shipped to the site is ready for operation in a manner that does not deviate substantially from one weld point to the next. In accordance with an aspect of the invention, the value determined by digital divider 622 is summed with an offset constant and squared before plotted as shown in FIG. 8. This has been shown to produce a better end result than merely using average current values.

The block diagram and flow chart of FIG. 5 is performed by a computer program using regression algorithms. This program is incorporated in the microprocessor(s) of the welder, which processor is available in most high speed inverter type welders. The various procedures so far described are digitally performed by the computer program except for the analog outputs necessary for controlling the actual firing points of the various switches in welder 400. Several programs could be devised for accomplishing the objectives and purpose of the present invention.

Having thus defined the invention, the following is claimed:

1. A method of designing a series of waveforms for current cycles generated by a waveform generator to control the waveforms of a welding process performed by an electric arc welder, said waveforms being stored in a memory stack by work points, said method comprising:
   (a) integrating the arc current of the waveform designed for each of the many work points to obtain an integrated amount;
   (b) plotting said integrated amounts for each of said work points;
   (c) creating a regression curve statistically matching said plotted amounts to reveal outlier amounts;
   (d) selecting an outlier amount; and,
   (e) changing said waveform corresponding to said selected outlier amount to decrease the deviation of the integrated amount of said changed waveform from said regression curve.

2. A method as defined in claim 1 wherein said regression curve is a polynomial regression.

3. A method as defined in claim 2 wherein said curve is a straight line.

4. A method as defined in claim 1 wherein said curve is a straight line.

5. A method as defined in claim 1 wherein said integrated amounts are each divided by the cycle time of said waveforms to provide an average current value for each waveform and including:
   (f) plotting said average current values for each of said work points;
   (g) creating a second regression curve statistically matching said plotted values to reveal outlier values;
   (h) selecting an outlier value; and,
   (i) changing said waveform corresponding to said selected outlier value to decrease the deviation of the average current value of said changed waveform from said second regression curve.

6. A method of designing a series of waveforms for current cycles generated by a waveform generator to control the waveforms of a welding process performed by an electric arc welder, said waveforms being stored in a memory stack by work points, said method comprising:
   (a) integrating the arc current of the waveform designed for each of many work points to obtain an integrated amount;
   (b) dividing each of said integrated amounts by the cycle time of said waveforms to provide an average current value for each waveform;
   (c) plotting said average current value for each of said work points;
   (d) creating a regression curve statistically matching said plotted values to reveal outlier values;
   (e) selecting an outlier value; and,
   (f) changing said waveform corresponding to said selected outlier value to decrease the deviation of the average current value of said changed waveform from said regression curve.

7. A method as defined in claim 6 wherein said regression curve is a polynomial regression.

8. A method as defined in claim 7 wherein said curve is a straight line.

9. A method as defined in claim 6 wherein said curve is a straight line.

10. A method of designing a series of waveforms for current cycles generated by a waveform generator at the output of an electric arc welder for a number of work points, such as wire feed speeds, said method comprising integrating the arc current of a waveform designed for each of said work points, plotting said integration amounts per work point identifying any of said integration amounts deviating from a curve statistically matching said amounts and manually changing said waveform corresponding to said deviated amount to smooth said series of waveforms.

11. A method as defined in claim 10, wherein said curve is created by polynomial regression.

12. A method as defined in claim 10, wherein said curve is a straight line.

13. A method as defined in claim 10, wherein said integrated amounts are each divided by the cycle time of said waveform to provide average current value, adding an off set constant current to said value to give a number and then squaring said number to give a calculated value, plotting said calculated values per work point, identifying calculated value deviating from a curve statistically matching said calculated values and changing said waveform corresponding to said deviated value to smooth said series of waveforms.

14. A method as defined in claim 13, wherein said curve is created by polynomial regression.

15. A method as defined in claim 14, wherein said curve is a straight line.

* * * * *